United States Patent [19]

Kalwar

[11] 4,002,907
[45] Jan. 11, 1977

[54] ARRANGEMENT FOR TREATING SHEET-MATERIAL WEBS BY CORONA DISCHARGE

[76] Inventor: Klaus Kalwar, Alte Landwehr 10, 4803 Amshausen, Germany

[22] Filed: Oct. 15, 1975

[21] Appl. No.: 622,682

[30] Foreign Application Priority Data

Oct. 18, 1974   Germany ........................... 2449625

[52] U.S. Cl. ............................ 250/325; 317/262 A
[51] Int. Cl.² ......................................... H01T 19/04
[58] Field of Search .......................... 250/324, 325; 317/262 A

[56] References Cited

UNITED STATES PATENTS

| | | | |
|---|---|---|---|
| 3,397,136 | 8/1968 | Balogh | 250/324 |
| 3,419,489 | 12/1968 | Delaney | 250/325 |
| 3,890,504 | 6/1975 | VanPendelton et al. | 250/325 |

*Primary Examiner*—Alfred E. Smith
*Assistant Examiner*—B. C. Anderson
*Attorney, Agent, or Firm*—Michael J. Striker

[57] ABSTRACT

An arrangement is provided for advancing a sheet-material web in a path, and a device for producing corona discharges includes at least one electrode roller and at least one cooperating counter roller between which the web is compelled to pass. An edge position control controls the position of the edges of the web and includes portions of the electrode roller which serve as guides for the edges of the web.

16 Claims, 12 Drawing Figures

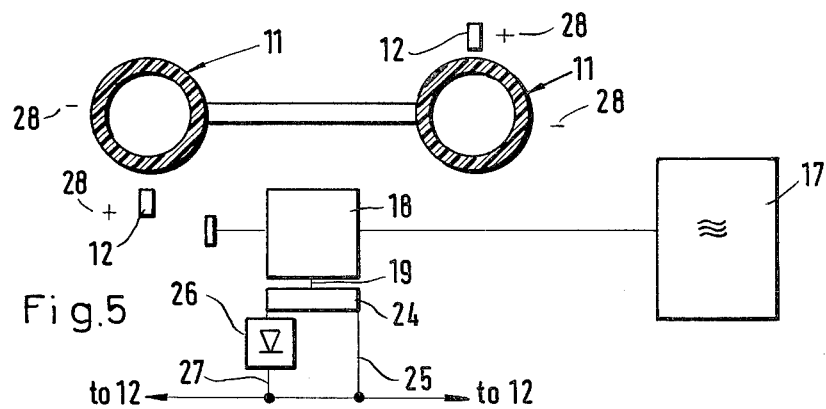
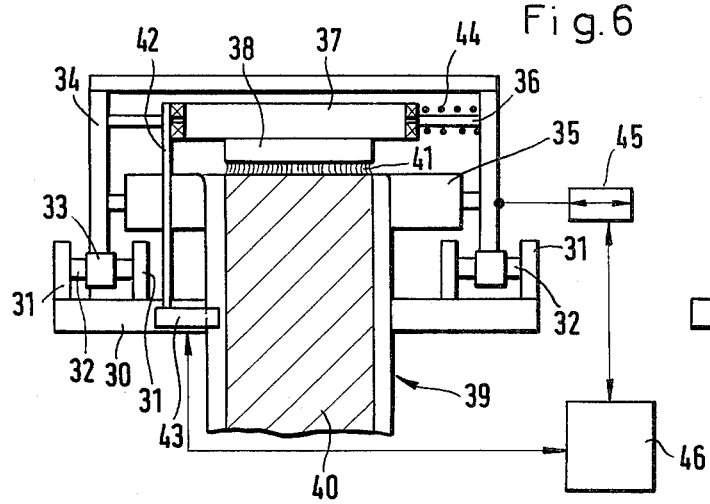
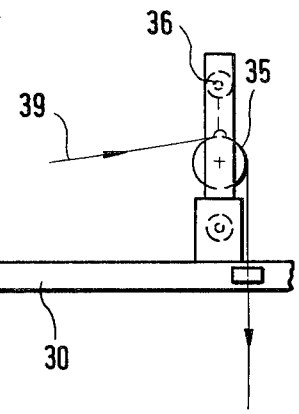
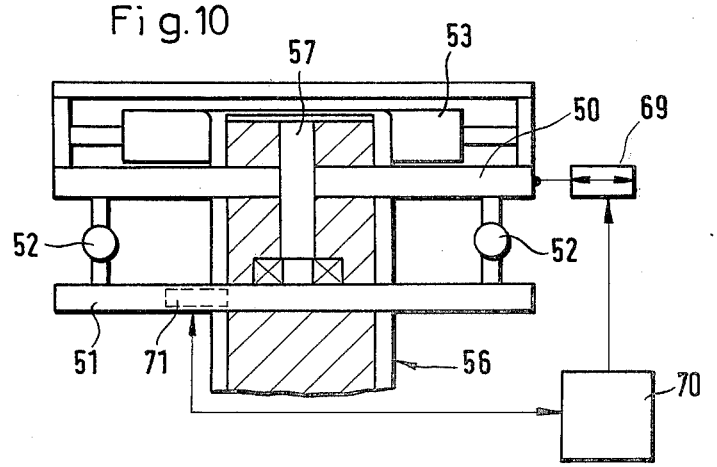

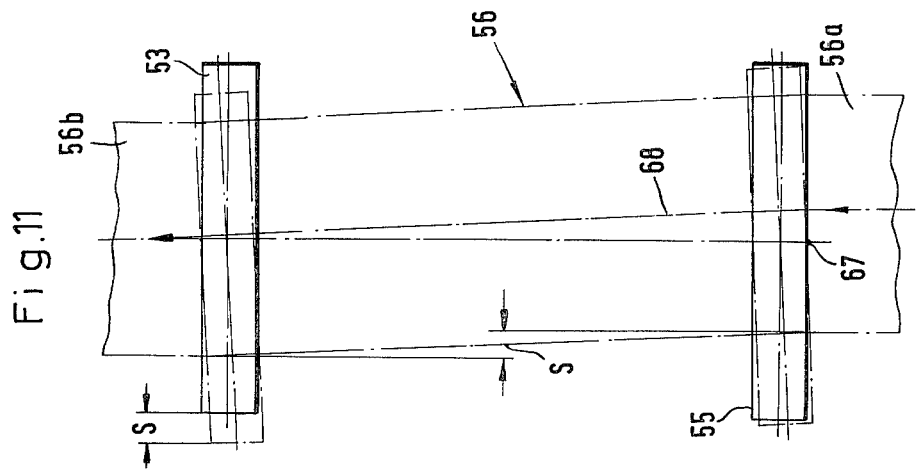
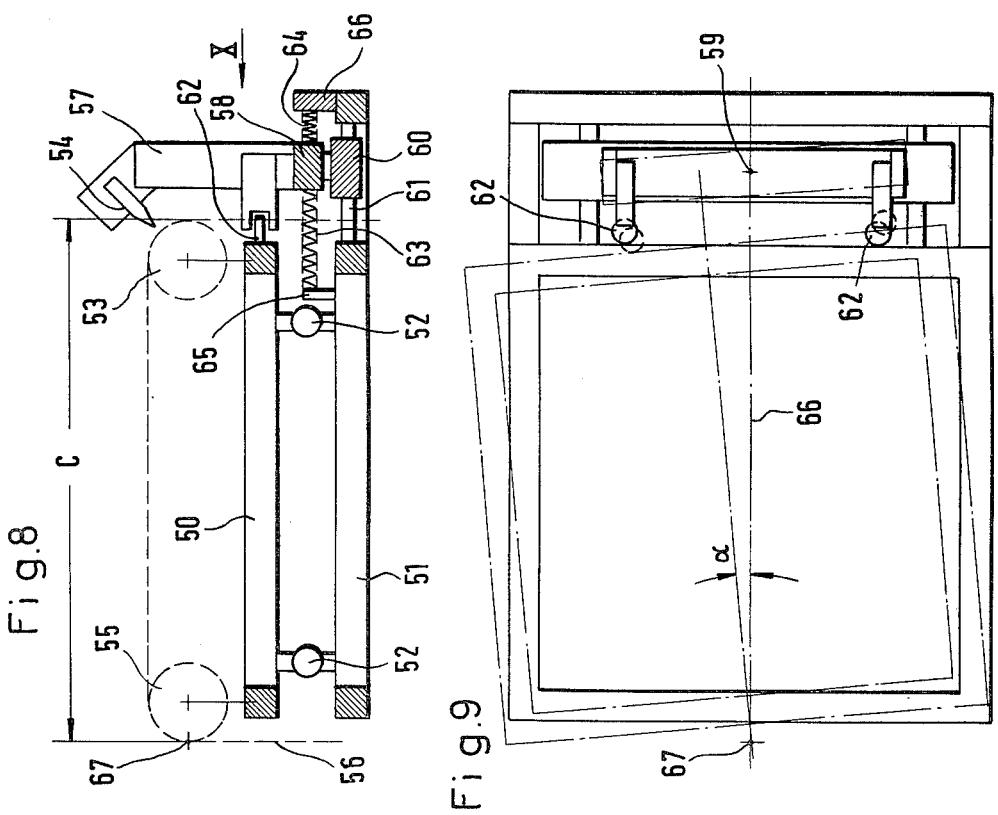

ARRANGEMENT FOR TREATING SHEET-MATERIAL WEBS BY CORONA DISCHARGE

BACKGROUND OF THE INVENTION

The present invention relates to an arrangement for treating sheet-material webs by corona discharge. In particular, it relates to such an arrangement wherein the webs are treated by corona discharge and which is provided with a control for controlling the position of the edges of the web.

In many sheet-material treating applications, for example in extruders for synthetic plastic foils, in printing machines, in coating machines or the like, it is highly important that the position of one or both edges of an advancing web or foil be precisely controlled. For this purpose it is known to provide so-called edge position controls.

Machines of this general type also frequently utilize devices for producing corona discharges. The purpose is to treat one or both surfaces of the web by means of the discharges with the result that the bonding capability of the treated surfaces, for example bonding to a coating layer or the like, is improved thereby. Such a corona discharge device is described in British Pat. No. 925,354.

Both of these types of equipment require space for installation. Space is, however, often at a premium in this type of equipment and this is a disadvantage. Furthermore, the edge control device changes the position of the edges and hence of the entire web either before or after passage of the web through the corona discharge device, since the web must be repositioned prior to advance to a further processing station, for example a printing station, such adjustments involve complementary adjustments to the electrodes which produce the corona discharge. This is also a disadvantage of the prior art.

SUMMARY OF THE INVENTION

It is, therefore, a general object of the invention to overcome the disadvantages of the prior art.

It is a more particular object of the invention to provide an improved arrangement for treating sheet-material webs by corona discharge.

Another object of the invention is to provide such an arrangement for treating sheet-material webs by corona discharge which is provided with an edge position control device that is simpler than those of the prior art and which, together with the corona discharge device, requires less installation space than those of the prior art.

In keeping with these objects, and with others which will become apparent hereafter, one feature of the invention resides in an arrangement for treating sheet-material webs by corona discharge. Briefly stated, this arrangement comprises means for advancing a sheet-material web in a path, corona discharge producing means which includes at least one electrode roller and at least one cooperating counter roller between which the web is compelled to pass, and edge position control means for controlling the position of the edges of this web. The edge position control means includes portions of the electrode roller which serve as guides for the edges of the web.

The arrangement of the present invention thus provides simultaneously for the treatment of one or both surfaces of the web by corona discharges and for the control of the edge position of the web, without requiring two completely separate devices.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 5 is a diagrammatic illustration of a further embodiment of the invention;

FIG. 5A is a section through the embodiment of FIG. 5, analogous to the section shown in FIG. 4;

FIG. 6 is a view of further embodiment of the invention;

FIG. 7 is a side view of the embodiment in FIG. 6;

FIG. 8 is an end view, partly sectioned, of an additional embodiment of the invention;

FIG. 9 is a top-plan view of FIG. 8;

FIG. 10 is a view of FIG. 8 seen in the direction of the arrow X; and

FIG. 11 is a diagrammatic top-plan view showing the area of the embodiment in FIGS. 8–10 wherein the edge position of a web can be adjusted.

DESCRIPTION OF THE PREFERRED EMBODIMENTS

Figure 1:
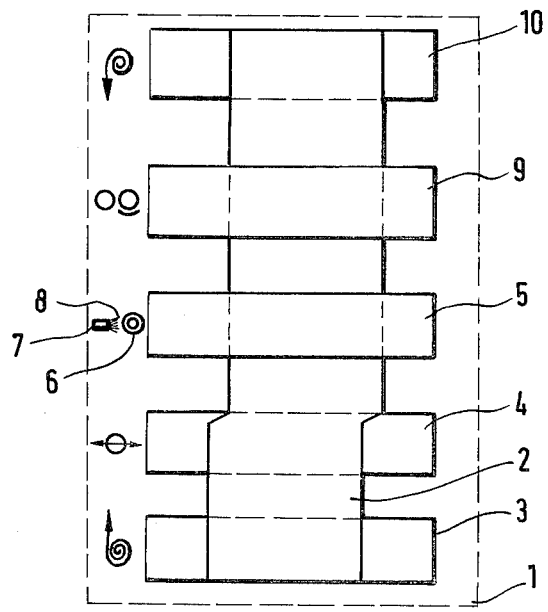
FIG. 1 is a very diagrammatic illustration of an arrangement of the type in question, but which is known from the prior art.

Referring now in detail to the drawing, and firstly describing FIG. 1 which shows an embodiment of an arrangement of the prior art, it will be seen that reference numeral 1 identifies in toto a machine on which a sheet-material web, for example a foil of synthetic plastic material, is unwound from the pay-off 3 and travels to the takeup 10 onto which it is wound. The web 2 travels through an edge position control device 4 and after it has been repositioned by this device, the web 2 travels to a treating station 5 in which it travels between a roller electrode 6 and a counter electrode 7 between which a corona discharge 8 is produced. As a result of being subjected to the corona discharge, the web 2 exhibits improved surface adhesion, i.e., an improved capability to bond with other substances. After passing through the station 5, the web then travels past or through a printing station 9 at which it is printed, and whereat the adhesion of the printing ink or the like to the web 2 is facilitated as a result of the preceding corona discharge treatment, and subsequently the web is then taken up at the takeup 10.

Figure 2:
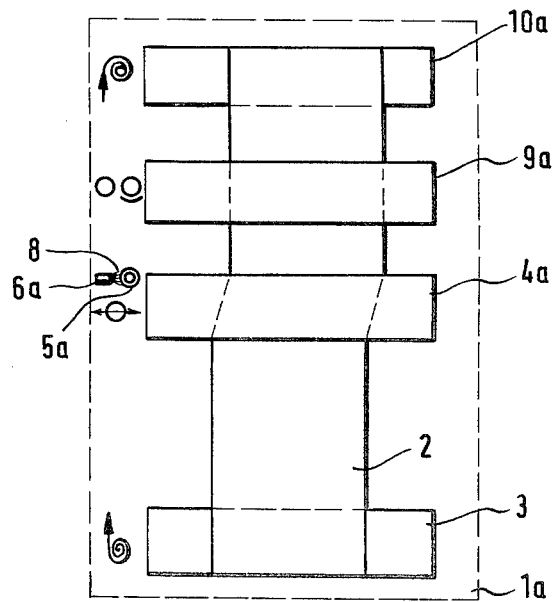
FIG. 2 is a view similar to FIG. 1, but shows an arrangement embodying the present invention.

An analogous arrangement, but incorporating the present invention, is shown in FIG. 2. The machine here is identified with reference numeral 1a and the web 2 is again withdrawn from the pay-out 3 and advanced to the takeup 10a where it is wound up. In the machine 1a of FIG. 2, however, the web 2 travels through a station 4a wherein it is subjected to two operations, namely both to an edge position adjustment and to a corona discharge 8 produced between electrodes 5a and 6a between which the web must travel. Because of the arrangement of the station 4a in accordance with the present invention, there is no readjustment necessary in the position of the electrodes 5a and 6a relative to one another or to the web. The treated web then travels to the printing station 9a and from there advances to the takeup 10a.

Figure 3:
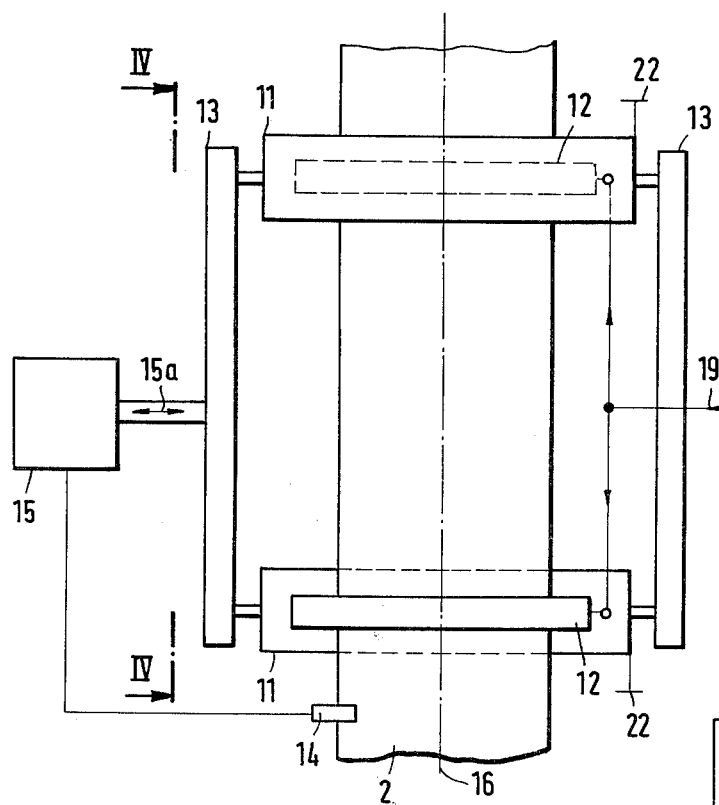
FIG. 3 is a fragmentary top-plan view in a diagrammatic illustration of an exemplary embodiment of the present invention.
Figure 4:
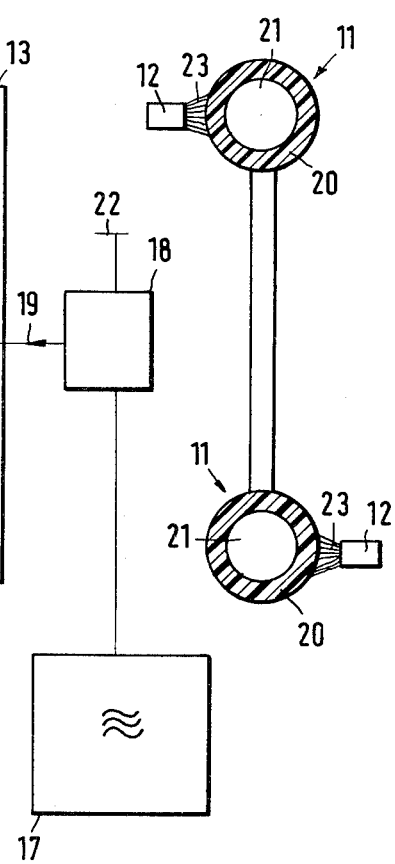
FIG. 4 is a section taken on line IV—IV of FIG. 3.

FIG. 2 illustrates the principle of the present invention. FIGS. 3 and 4, on the other hand, illustrate one exemplary embodiment.

In FIGS. 3 and 4, the web 2 will be seen to be made to travel between respective roller electrodes 11 and their associated counter electrodes 12. It should be noted that the web 2 passes between the two sets of roller electrodes and counter electrodes in such a manner that once its upper surface is positioned to face the counter electrode 12 and as it passes the next set of roller electrode and counter electrode its lower surface faces the counter electrode. The roller electrodes 11 and the counter electrodes 12 are all mounted in a support or frame 13 which can be shifted together with them in the direction of the double-headed arrow 15a in response to signals derived from a feeler 14 which operates a displacing device 15. Such feelers are manufactured by General Web-Dynamics, 4960 28th Avenue, Rockford, Illinois.

A generator 17 is provided which produces high frequency high voltage electrical energy that is supplied to a transformer 18 to be stepped up still further. The thus produced high voltage of the transformer 18 is supplied via conductors 19 to the counter electrodes 12. Each of the electrode rollers 11 has an electrically conductive core 21 surrounded by a dielectric material 20 which is of such characteristics that in the event of breakdown, no carbon is liberated and which is resistant to ozone. For example, the dielectric may be silicon or contain silicon. The high voltage electrical energy supplied to the counter electrodes 12 produces, relative to the core 21 and the dielectric 20 of the associated roller electrode 11, a corona discharge 23 which serves to significantly improve the adhesive bonding capability of the surface of the web 2. This improvement in the bonding capability is well known in the art and requires no detailed discussion because it is not per se a feature of the present invention.

A further embodiment of the invention is illustrated in FIGS. 5 and 5a which essentially differ from the embodiment in FIGS. 3 and 4 in that a transverse switch 24 is interposed in the secondary high voltage line 19. By means of the switch 24, the line 19 may be connected to a line 25 leading to the counter electrodes 12 for obtaining a pulsating corona discharge. In addition, the switch 24 offers the alternate possibility of supplying the high voltage to a rectifier 26 from which the rectified high voltage is supplied via a line 27 to the electrodes 12. In this latter case, no corona discharge 23 occurs; instead, electrical plus and minus potentials, identified with reference numeral 28 in FIG. 5A, develop. The purpose of this second possibility is to cause the web 2 to engage the roller electrodes 11 more firmly as it travels over them, as a result of the web 2 having been made to pass through the rectified high frequency high voltage field. This facilitates the correction in the positioning of the web.

The arrangement according to the present invention is rather simple in construction and therefore inexpensive to produce. Furthermore, it requires comparatively little space and can be used even if only part of a web 2 is to be treated, for example strips thereof which do not extend over the entire width of the web. Such strips can, however, also be transversely extending strips, or patterns or the like. If such partial treatment is desired, the arrangement is so modified that the counter electrode associated with a respective roller electrode can be controlled directly or indirectly via the feeler 14, while maintaining its relative position with reference to the associated roller electrode.

Coming to the embodiment illustrated in FIGS. 6 and 7, it will be seen that here is provided a stationary support or frame 30. Journals 31 are provided on the frame 30 and support slides 32 extending transversely to the direction of advancement of the web. Bearings 33 are provided to be shiftable lengthwise of the slides 32 and, in turn, support a frame 34 in which a roller electrode 35 is mounted is mounted. A shaft 36 is provided in the frame 34 and extends parallel to the roller electrode 35. A mounting element 37 for a counter electrode 38 is shiftably mounted on the shaft 36 and can be arrested in a plurality of desired positions by means of any well known, and therefore not illustrated, device. The counter electrode 38 has a length which is smaller than the width of the web which is here identified with reference numeral 39. This makes it possible to treat by means of a corona discharge 41 only certain portions of the web 39, for example the portion 40 which is emphasized by the inclined shading in FIG. 6.

The member 37 has one end face which engages a lever 42 that is coupled with the feeler 43 of the edge position control. The end face is urged into permanent abutment with the lever 42 by a spring 44 which engages the opposite end face of the member 37 and bears upon the frame 34. Thus, the lever 42 and the spring 44 together assure that the position of the counter electrode 38 relative to the roller electrode 35 is maintained, even if an axial shifting of the frame 34 is effected via a hydraulic cylinder 45 and a hydraulic pump 46 that are provided for this purpose.

A final exemplary embodiment of the invention is illustrated in FIGS. 8–11. This embodiment has an upper frame 50 and a lower frame 51 which are connected with one another by means of bearings 52. A roller electrode 53 is turnably mounted in the upper frame 50 and has associated with it a counter electrode 54. A guide roller 55 is also mounted on the upper frame 50, spaced from the roller electrode 53. The center axis of the rotatable guide roller 55 extends parallel to the center axis of the roller electrode 53. The latter, together with the guide roller 55, determine for the web 56 the correction distance C shown in FIG. 8, i.e., the distance over which corrections in the edge position of the web 56 are effected.

Counter electrode 54 has a holding member 57 which is mounted on an upper carriage 58. The upper carriage is mounted on a lower carriage 60, being turnable relative thereto about a vertical axis 59. The lower carriage 60 is movably mounted on longitudinal guides 61 of the lower frame 51. Rollers 62 of the upper carriage 58 engage the upper frame 50 and are pressed against the latter by means of springs 63 and 64 of which the former are tensile springs which act between the upper carriage 58 and an arm 59 of the lower frame 51, whereas the springs 54 are pressure springs which act between an arm 66 of the lower frame 51 and the upper carriage 58.

FIG. 9 shows that the upper frame 50 is pivotable in the center plane 66 of the device, about a pivot point 67 which extends vertically and is located outside the confines surrounded by the upper frame 50. The pivot point 67 is located on the horizontal center plane of the guide roller 55 and the roller electrode 53, i.e., in a plane passing through the axis of rotation of these rollers.

When an edge position error of the web 56 is to be corrected, this is done by pivoting the upper frame 50 in such a manner that the spacing of the center line 68 of the web 56 from the ends of the roller electrode 53 remains as constant as possible.

The counter electrode 54 cooperating with the roller electrode 53 can thus be maintained constant in its orientation relative to the roller electrode 53 in the center line during pivoting of the upper frame 50 which is necessary for correction purposes. The counter electrode must, however, be adjusted in longitudinal direction and in its angle relative to the lower frame.

When the edge position of the web is adjusted, the lower carriage 60 is displaced by an amount which can be determined in accordance with the formula $s_v = (C/\cos \alpha) - C$ wherein $\alpha$ is the pivoting angle of the upper frame 50 which is shown in FIG. 9.

The upper carriage 58 assumes an angular position which is determined from the displacement distance s and the length C in accordance with the formula $\tan \alpha = (S/C)$.

It is emphasized that in FIG. 8 the web portion which has not yet had its edge position corrected is identified with reference numeral 56a and the portion wherein the edge position has already been corrected is identified with reference numeral 56b.

The pivoting of the upper frame 50 about the pivot point 67 is effected by means of a hydraulic cylinder 69 which receives fluid from a pump 70, the latter being controlled by a feeler 71 that feels the edge position of the web 56.

It will be understood that each of the elements described above, or two or more together, may also find a useful application in other types of constructions differing from the type described above.

While the invention has been illustrated and described as embodied in an arrangement for treating sheet-material webs by corona discharge, it is not intended to be limited to the details shown since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for treating sheet-material webs by corona discharge, a combination comprising means for advancing a sheet-material web in a path; corona discharge producing means, including at least one electrode roller and at least one cooperating counter roller between which said web is compelled to pass; and edge position control means for controlling the position of the edge of said web, including portions of said electrode roller which serve as guides for the edges of said web, sensing means for sensing deviations in the position of said edge from said path, and adjusting means for adjusting the position of said electrode roller in direction transverse to said path so as to compensate for the sensed deviations.

2. A combination as defined in claim 1, said electrode roller comprising a body and a dielectric material on said body.

3. A combination as defined in claim 2, said dielectric material being of a type which is ozone resistant and fails to liberate carbon in the event of dielectric breakdown.

4. A combination as defined in claim 1; further comprising conductor means for conducting a high voltage to said counter electrode, said conductor means being located within said arrangement.

5. A combination as defined in claim 1; further comprising a frame in which said electrode roller is mounted; said adjusting means being operative for adjusting the position of said frame in direction transverse to the movement of said web.

6. A combination as defined in claim 5, wherein said counter electrode is also mounted in said frame.

7. A combination as defined in claim 1; further comprising means for conducting high voltage electrical energy to said counter electrodes, comprising a high voltage supply circuit, a first line connected with said counter electrode, a second line also connected with said counter electrode and including a high voltage rectifier interposed in said second line and a switch for connecting said supply conduit with a selected one of said lines.

8. A combination as defined in claim 1, said sensing means comprising feeler means controlling the position of said electrode roller relative to said web, and means for maintaining said counter electrode in a predetermined position relative to said electrode roller.

9. A combination as defined in claim 8; further comprising a frame movable transverse to the direction of movement of said web and carrying said electrode roller, and a further roller in said frame parallel to said electrode roller and having an adjustable and arrestable holding element for said counter electrode which has a lesser axial length than the width of said web.

10. A combination as defined in claim 9, said holding element having one end face in engagement with an abutment which is coupled with said feeler means, and another end face biased in direction towards said abutment by a biasing spring.

11. In an arrangement for treating sheet-material webs by corona discharge, a combination comprising means for advancing a sheet-material web in a path; corona discharge producing means, including at least one electrode roller and at least one cooperating counter roller between which said web is compelled to pass; edge position control means for controlling the position of the edge of said web, including portions of said electrode roller which serve as guides for the edges of said web, a frame in which at least said electrode roller is mounted, said frame including an upper frame element and a lower frame element, and bearings supporting an upper frame element on said lower frame element, said electrode roller being mounted in said upper frame element and the latter being pivotable about a pivot axis located outside the confines surrounded by said upper frame element.

12. A combination as defined in claim 11; further comprising an additional roller mounted in said upper frame element, extending parallel to said electrode roller and serving to guide said web.

13. A combination as defined in claim 11; further comprising a holder for said control electrode, said holder being elastically yieldably engaged by said upper frame element and being turnable about an upright axis as well as being movable lengthwise of said lower frame element.

14. A combination as defined in claim 13; further comprising an upper carriage supporting said roller and being turnably arranged on a lower carriage, the latter being shiftably mounted on longitudinal guides of said lower frame element.

15. A combination as defined in claim 14, said upper carriage having rollers in rolling engagement with said upper frame.

16. A combination as defined in claim 15; and further comprising spring elements arranged between said upper carriage and said lower frame element.

* * * * *